United States Patent Office 3,764,408

Patented Oct. 9, 1973

3,764,408

METHOD OF OBTAINING GALLIUM ALUMINUM ARSENIDE FOR AN ELECTROLUMINESCENT DIODE

Marc Mahieu, Caen, Elie Andre, Herouville-Saint-Clair, and Jean-Marc Le Duc, Caen, France, assignors to U.S. Philips Corporation, New York, N.Y.

Filed May 8, 1972, Ser. No. 251,009
Claims priority, application France, May 12, 1971, 7117119
Int. Cl. H01l 7/40
U.S. Cl. 148—171 4 Claims

ABSTRACT OF THE DISCLOSURE

A method of obtaining an epitaxial layer for an electroluminescent diode from a solution of arsenic in a melt of gallium and aluminum which is contacted with a substrate of gallium arsenide prior to cooling.

The method is characterized in that the weight percentage $C_L$ of the aluminum of the melt relative to the gallium which is present in excess to the composition gallium arsenide is 0.05 to 0.8% and that during the contact the temperature T of the melt lies within a range of 6° C. around the value which is given by the following equation:

$$T \text{ in } ^\circ\text{C.}=884+(3200 \text{ Log } (C_L+0.7))^{0.7575}$$

The present invention relates to a method of obtaining, by liquid epitaxy, a monocrystalline semiconductor material for an electroluminescent diode the emitted radiation of which has an energy which lies between 1.75 and 1.90 e.v., and which consists mainly of arsenic, gallium and aluminum. According to this method a saturated homogeneous solution of arsenic in a melt of gallium and aluminum is made in a crucible after which said solution is contacted with a monocrystalline substrate of gallium arsenide, after which the solution is slowly cooled.

It is known that by diffusion of zinc in the ternary monocrystalline semiconductor material, which consists of arsenic, gallium and aluminum, $Ga_{1-x}Al_xAs$, the composition of which is such that the molar ratio of aluminum $x$ is lower than 0.34 with a corresponding molar ratio $1-x$ for gallium of the n-type, junctions are formed which at normal temperature produce a radiation the wavelength of which depends upon $x$. Said wavelength is of the order of 6750 A., which corresponds to an energy of 1.84 e.v. when $x$ lies near 0.34, which wavelength corresponds to a radiation of a red colour.

In this specification, the radiation is considered indeed in the wavelength range between 6540 A. and 7100 A., which corresponds to 1.9 and 1.75 e.v., respectively, by a ternary compound of aluminum $Ga_{1-x}Al_xAs$, wherein $x$, which lies near 0.34, lies substantially between 0.34 and 0.24.

Because for each composition of $Ga_{1-x}Al_xAs$ for which $x$ is equal to or lower than 0.34 the band transition is a direct one, the emission in the point where it is produced is particularly efficacious.

Unfortunately, experience teaches that said emission is very difficult to use and that the diodes available nowadays have a very low luminous efficiency, in which the light beam emanates mainly via the crystal plane which extends at right angles to the plane of the junction.

These difficulties, which occur in use, mainly originate from the present-day methods of preparing the ternary material $Ga_{1-x}Al_xAs$, which is obtained by liquid hetero-epitaxy on the gallium arsenide substrate from liquid solutions of arsenic and aluminum in gallium, which is allowed to cool slowly.

Actually, during liquid epitaxy the two metals deposit at different rates. Aluminum which has a smaller atom is smaller than gallium and has a smaller solubility. As a result of the aluminum, this will deposit first and its concentration decreases regularly when the thickness of the deposit increases, while the concentration of arsenic remains constant.

From this unequal and continuous distribution of the metal concentrations along the growth axis of a crystal $Ga_{1-x}Al_xAs$, which is often termed the crystal profile, it follows that the optic properties of the said crystal also evolve continuously in the direction of growth.

If the aluminum concentrations of two adjacent layers lie close together, the optical properties lie close together, if their concentrations are far apart, the optical properties lie far apart.

So, if the profile of a layer is such that the mutual concentration of aluminum is of the order of 0.34 on a non-negligible thickness, it is easy to control the conditions to obtain a suitable zinc diffusion thickness, that is to say such that the junction is at a level at which $x$ is equal to 0.34. So it is of importance to obtain a profile having a flat variation.

Another consequence of the selective deposition of aluminum at the beginning of liquid epitaxy is that the final layer of the epitaxial layer of $Ga_{1-x}Al_xAs$ is rich in gallium and that the properties thereof approach those of pure GaAs.

A junction which is provided in such a plate by diffusion from the surface of the epitaxial layer at a level at which the composition $Ga_{1-x}Al_xAs$ enables the evolution of a particularly favourable radiation, for example red light, thus lies between a layer of gallium arsenide (the initial substrate) and a surface layer, the properties of which tend to approach those of gallium arsenide; semiconductor having a direct band transition with a forbidden band the width of which corresponds to a smaller energy than that of the red radiation which in general it is desired to obtain.

It is known that a given material is the more transparent to light radiation according as the width of the forbidden band which characterizes the said material is larger relative to the energy of the photons of the said radiation and, conversely, that it absorbs the more according as the forbidden band is smaller relative to the energy of the photons of the said radiation.

The forbidden band of pure AsAl (2.9 e.v.) is significantly larger than the forbidden band of pure GaAs (1.4 e.v.) and the width of the forbidden band of the ternary material $Ga_{1-x}Al_xAs$, that the transparency thereof, decreases with the aluminum ratio decreasing and gallium ratio increasing. This means that the successive layers of an epitaxial layer $Ga_{1-x}Al_xAs$ which have been obtained by liquid epitaxy become increasingly less transparent to radiations from a junction created in the depth of the said epitaxial layer.

Since the wavelength of the emitted radiation corresponds to the band spacing between the conductivity band and the level of the donor which is created by the doping material in the region of the n-type (usually tellurium), which spacing is slightly smaller than that of the forbidden band of pure material, the red radiation which is emitted by a zone for which $x$ lies near 0.34 is only slightly absorbed by the layers which have an aluminum ratio which lies slightly below 0.34.

Thus, the red light which is developed in the crystal of $Ga_{1-x}Al_xAs$ by a junction which lies at the level of the layer having the suitable composition $x=0.34$ and which can emanate via the face of the crystal is absorbed and reflected if it propagates on the side of the substrate and it can leave the crystal via the active face thereof if the surface layers of the said crystal have a forbidden band with a width which is hardly less than that which corresponds to the energy of the red radiation which is caused by the said junction.

Such a property can result only from a profile having a slightly inclined variation of the epitaxial layer on either side of a layer for which $x=0.34$.

The present invention provides a solution to said problem. Actually, applicants have observed that the resulting profile, especially at the surface, depends mainly upon the condition at the beginning of the preparation of the ternary material. The growth by liquid epitaxy of a layer of $Ga_{1-x}Al_xAs$ is carried out generally from an oversaturated solution of arsenic in liquid gallium, which may contain variable quantities of aluminum and which can be crystallized on a substrate of gallium arsenide from different temperature conditions.

The method according to the invention relates to obtaining by liquid epitaxy a monocrystalline semiconductor material for electroluminescent diodes the emitted radiation of which has an energy which lies between 1.75 and 1.90 e.v. and which consists mainly of arsenic, gallium and aluminum. According to the method of the invention a saturated homogeneous solution of arsenic in a melt of gallium and aluminum is made in a crucible, after which said solution is contacted with a monocrystalline substrate of gallium arsenide, after which the solution is slowly cooled and is particularly characterized in that the percentage by weight of the aluminum of the melt relative to the gallium which exceeds the stoichiometric composition of gallium arsenide lies between 0.05 and 0.8% and that at the instant at which the melt is contacted with the substrate the temperature in ° C. of the latter lies within 6° C. of the value which is found by adding 844 to the number which is obtained by raising to the power 0.7575 the product of the factor 3200 and the decimal logarithm of the sum of the weight percentage of aluminum relative to the excess of gallium in the solution and of the number 0.7, and that the crucible is allowed to cool slowly from said temperature.

A cooling rate of 0.5 to 1.5° C. per minute for, for example, approximately 3 hours will preferably be used.

It is to be noted that the thermodynamic data known nowadays do not permit of deducing simply said law and that this law results from experimental investigations performed by applicants.

In addition it is to be noted that the above denoted physical law can be written in the mathematical language:

$$T=844+(3200 \operatorname{Log} (C_L+0.7))^{0.7575}$$

where

T denotes the temperature in ° C.) and $C_L$ the weight percentage aluminum of the melt relative to that quantity of gallium which exceeds the stoichiometric composition of gallium arsenide and that the temperature range thus defined comprises 3° C. below and 3° C. above said temperature value.

Experience has hown that by using the thus defined conditions an epitaxial layer is obtained having a profile according to which $x$ decreases regularly and slowly and reaches the value 0.34 near the surface at a small depth. The exact value of the depth for which said value is reached depends upon the initial conditions, the value of the percentage of aluminum at the beginning, and the corresponding temperature, but it is always small, in the order of 1 micron, at which depth a junction can be created. Furthermore the aluminum concentration gradient is small and regular. As a result of this the depth at which the junction is to be present is not critical. On the other hand the light is not absorbed or is absorbed slightly and a beam can emerge from the surface of the thus deposited expitaxial layer.

Moreover the state of the surface of the plate is excellent, much better than that which is obtained by operating at higher temperatures, which is of great importance for subsequent treatments, such as photo-etching, to which said material is to be subjected.

The resulting material has a direct band transition, the inner quantum efficiency is high and the recombination of the carriers is rapid: 1 nanosecond.

Further, applicants do not want to limit the above-described method according to the invention for a semiconductor material for an electroluminescent diode with an arbitrary explanation of the structure of said material.

Starting from such a plate of the n-type, for example, a region of the p-type and an electroluminescent pn-junction can be produced by zinc diffusion.

In order that the invention may be readily carried into effect, it will now be described in greater detail, by way of example, with reference to the accompanying drawings, in which:

FIG. 1 shows at P1 the profile which is obtained according to the method of the invention and shows at P2 one of the profiles which are obtained by using conditions which are not in conformity with those of the present invention.

Figure 1:
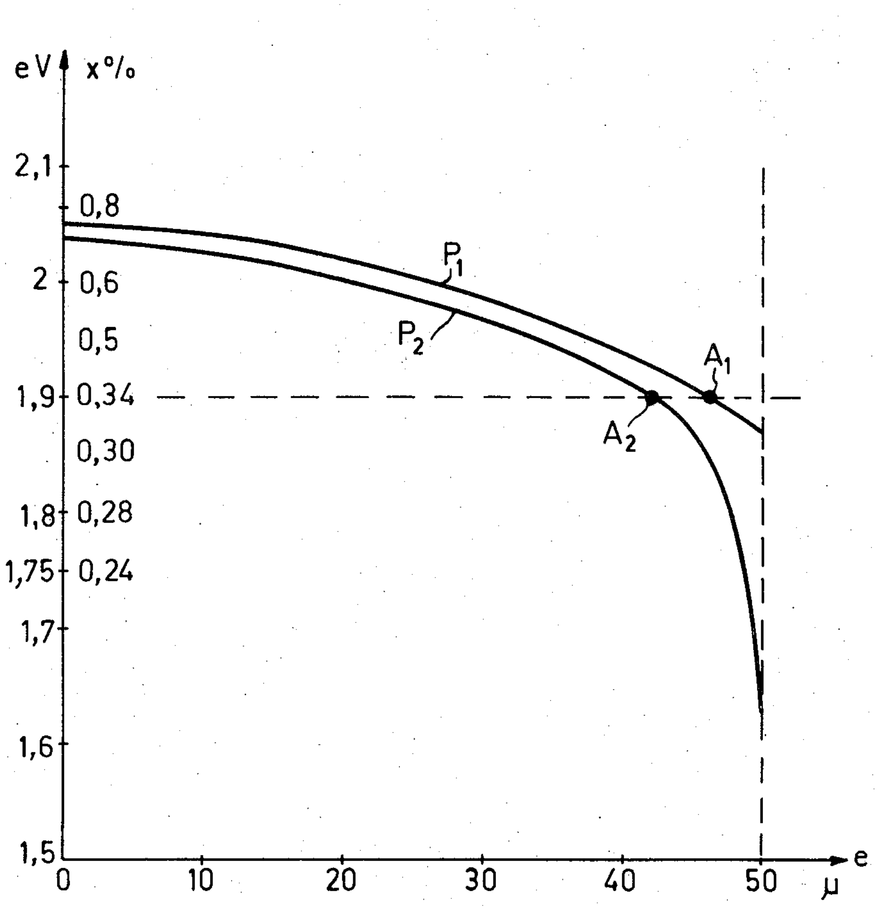
FIG. 1 shows two profiles of aluminum content of an epitaxial layer of $Ga_{1-x}Al_xAs$, of which one is obtained by means of a method according to the invention and the other of which is arbitrary.

On the $x$-axis of FIG. 1 is plotted the dimension in $\mu$m. of the distance in a 50$\mu$ thick epitaxial layer to the flat surface of the starting substrate. On the $y$-axis has been plotted the relative content of aluminum $x$ of the layer in question and the energy in e.v. of the radiation emitted by a junction in said material.

The points corresponding to $x=0.35$ are denoted by A1 on curve P1 and by A2 on curve P2.

Between said points and the ordinate axis, on said curve, the resulting material, that is to say, the whole deep part of the epitaxial layer, has an indirect transition and cannot produce any favourable radiation.

Between said points A1, A2 and the dimension 50$\mu$, which is that of the surface of the epitaxial layer, the material has a direct transition and can produce a particularly favourable radiation.

In the case of curve P1, said radiation is a particularly important red radiation and because for the last layers of the epitaxial layer the width of the forbidden band is hardly smaller than that at the surface where the radiation is formed, the radiation is absorbed only weakly and an important beam can emanate via the surface of the epitaxial layer.

On the contrary, because the composition of the epitaxial layer varies only little from one layer to the other, the depth of the junction which is to be formed to obtain the emission is not critical.

In the case of curve P2, said radiation is a red or infrared radiation, in accordance with the depth on which the junction is provided by diffusion. Because the composition of the epitaxial layer strongly varies from one layer to the other, the depth of the junction which is to be formed to obtain the emission at the desirable frequency is very critical and owing to the rapid decrease of the forbidden band in the direction of the surface of the epitaxial layer, any light beam emitted in the red would actually be absorbed totally by the surface layers of the epitaxial layer.

Figure 2:
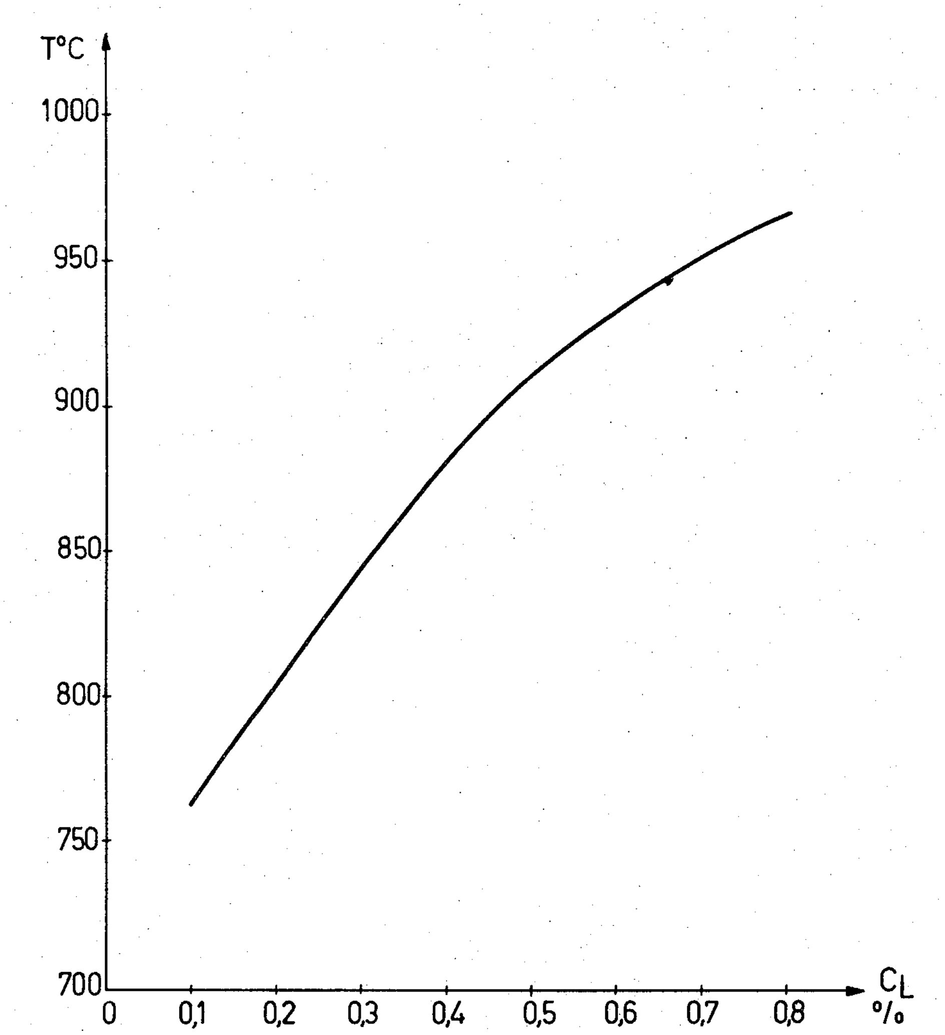
FIG. 2 is a curve of the value of the temperature at which the contact between the saturated solution and the substrate is to be carried out as a function of the aluminum concentration in liquid gallium according to the present invention.

On the $x$-axis of FIG. 2 are plotted the percentages of the aluminum relative to the quantity of gallium which exceeds the stoichiometric composition of gallium arsenide, $C_L$ and on the $y$-axis the temperature at which according to the present invention the contact between the saturated liquid and the substrate is to be carried out.

The curve shown in the figure may be represented by the equation:

$$T=844+\{3200 \log (C_L+0.7)\}^{0.7575}$$

where

T is the temperature in degrees Celsius $C_L$ is the percentage by weight of aluminum relative to the excessive gallium in the solution, the logarithm being decimal.

Figure 3:
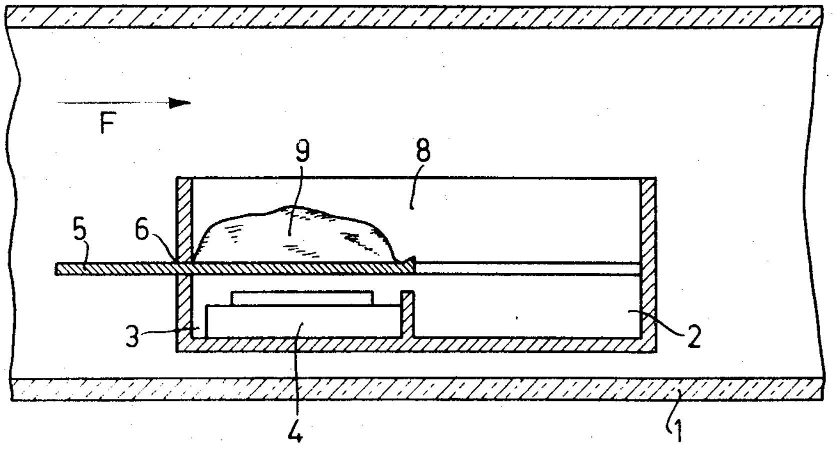
FIG. 3 shows a furnace and a crucible which can be used for carrying out the method according to the present invention.

Referring now to FIG. 3, reference numeral 1 denotes a quartz tube which serves as a furnace space and reference numeral 2 denotes a crucible in which the epitaxial deposition is carried out. A flow of hydrogen is passed through said space in the direction of the arrow F. If the material is to be doped with tellurium, the hydrogen is passed over a tellurium source at a point of the space not shown in the figure which is at a temperature between 380 and 450° C., the tellurium concentration of the hydrogen, so the doping of the resulting epitaxial layer, depending upon the said temperature. A doping is obtained which is particularly favourable for manufacturing electroluminescent devices by maintaining the tellurium source at a temperature near 400° C.

The crucible 2, described in the French patent application No. 1,600,341 granted to applicants on July 20, 1970, of a readily machinable material, which can withstand the important temperature increases or variations without variation in structure, for example graphite or boron nitride, comprises a first chamber 3 in which a substrate 4 for depositing the epitaxial layer is provided.

A movable partition 5 enters the vessel 2 via a slot 6 of the same cross-section and slides inwards in which it is guided parallel to the surface of the substrate by two slots, not shown in the drawing, present in the walls of the said crucible.

In general the partition 5 is at least 1 mm. from the substrate 4.

The partition separates an upper part 8 from the whole of the crucible.

According to the present invention, a suitable quantity of arsenic is added to a given quantity of gallium, for example 25 g., so as to obtain a super saturated arsenic solution. This solution can easily be obtained by adding to the gallium 8% gallium arsenide (for example 2 g. gallium arsenide to 25 g. gallium).

The quantity of aluminum which is necessary to obtain the initially desired concentration is then added. If, for example, a weight concentration of 0.1% aluminum relative to gallium which is present in excess to the gallium associated with the arsenic is desirable, which is a particularly favourable concentration, 0.025 g. aluminum is added to 25 g. gallium.

These various elements are added at 9 in the upper compartment 8 of the crucible 2 the partition 5 of which is in the position in which it constitutes a horizontal separation in the vessel.

The gallium arsenide substrate 4 which is oriented according to the 100 plane and etched, for example in known manner by a solution of bromine in methanol has previously been provided in the lower compartment 3 of the said crucible.

The assembly is heated at the temperature which is given by the law indicated above in this description so as to obtain the aluminum and arsenic solution in gallium. For example, at an aluminum concentration of 0.1% in gallium which is present in excess to the stoichiometric concentration of GaAs, heating is carried out to a temperature of 768° C. The assembly is left at said temperature for approximately 2 hours, so that a properly homogeneous solution is obtained. When the temperature is stabilized, the partition 5 is withdrawn as a result of which the solution 9 of aluminum and arsenic in liquid gallium is contacted with the gallium arsenide substrate 4.

The crucible is then cooled; a cooling of 1° per minute for approximately 3 hours is preferably used.

When in this manner the temperature has been reduced by 200°, the plate may be drawn out of the furnace; liquid gallium is still present at the surface which can easily be removed. The plate is ready for use.

By this process a plate of a very good quality is obtained in which an electroluminescent junction can easily be made in the following manner.

The plate is placed in an evacuated space which also comprises zinc, aluminum, indium and gallium arsenide. The quantity of zinc must be sufficient to maintain a saturated vapour tension of the zinc in the closed evacuated space, in which the process takes place, the quantities of aluminum and gallium arsenide must be sufficient to prevent surface degradation of the ternary compound of $Ga_{1-x}Al_xAs$ at the surface of the plate: for example, if, for an epitaxial plate of 1 to 2 sq. cm., the space has a volume of 25 to 30 cc., the quantities to be used may be, for example, 20 mg. zinc, 10 mg. aluminum, 10 mg. indium, 100 mg. gallium arsenide.

The closed evacuated space is placed in a diffusion furnace for a few minutes, for example 8 minutes, at a temperature near 850° C.

In the epitaxial layer 41 of a plate 40, a region 42 of the p-type is thus obtained having a depth of a few $\mu$m., approximately 6 $\mu$m., with a diffusion duration of 8 minutes.

Figure 4:
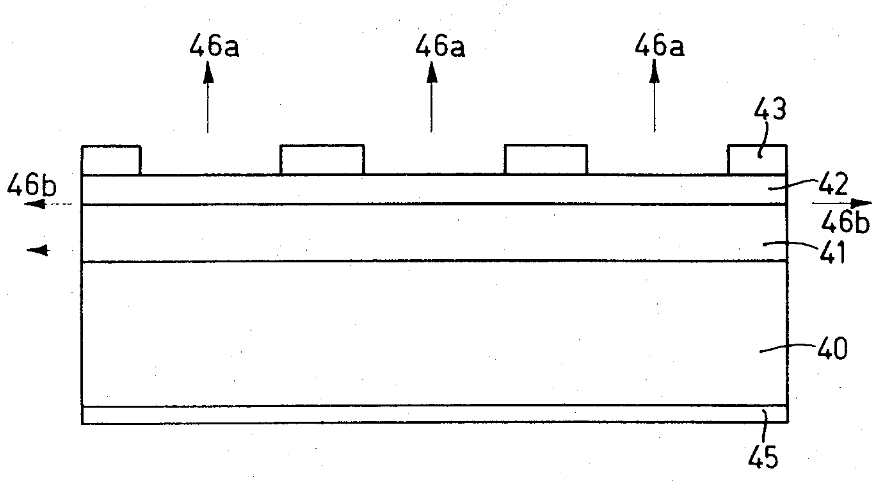
FIG. 4 shows an electroluminescent device starting from a plate which is manufactured according to the present invention.

A gold or aluminum metallisation is carried out in suitable places at the surface of the epitaxial layer so as to create the contacts 43, after which the rear face of the plate is ground down to eliminate the diffused layer of the p-type which was formed during the zinc diffusion. Finally, tin-plating 45 of the rear face is carried out. The plate in this stage is shown in FIG. 4. The arrows 46 denote the luminous flux which is emitted in various directions: at **46*a* the flux emitted at right angles to the main surface, at 46*b*** the flux emitted by the side face of the plate.

The crystals may then be separated, if desirable, and incorporated in an envelope.

What is claimed is:

1. A method of obtaining, by liquid epitaxy, a monocrystalline semiconductor material for an electroluminescent diode, the emitted radiation of which has an energy which lies between 1.75 and 1.90 ev. and which consists mainly of arsenic, gallium and aluminum, according to which method a saturated homogeneous solution of arsenic in a melt of gallium and aluminum is made in a crucible after which said solution is contacted with a monocrystalline substrate of gallium arsenide, after which the solution is slowly cooled, characterized in that the percentage by weight of the aluminum of the melt relative to the gallium which exceeds the stoichiometric composition of gallium arsenide lies between 0.05 and 0.8% and that at the instant at which the melt is contacted with the substrate the temperature in ° C. of the latter lies in the range of 6° C. around the value which is found by adding 844 to the number which is obtained by raising to the power 0.7575 the product of the factor 3200 and the decimal logarithm of the sum of the weight percentage of aluminum relative to the excess of gallium in the solution and of the number 0.7, and that the crucible is slowly cooled from said temperature.

2. A method as claimed in claim 1, characterized in that the cooling rate of the temperature of the crucible lies between 0.5° C. per minute and 1.5° C. per minute.

3. A method as claimed in claim 2 of obtaining a semiconductor material of the $n$-type, characterized in that the liquid epitaxy is carried out in a reducing atmosphere which contains tellurium.

4. A method as claimed in claim 3, characterized in that the reducing atmosphere is a flow of hydrogen which is passed over tellurium at a temperature between 380 and 450° C.

References Cited

UNITED STATES PATENTS

| | | | |
|---|---|---|---|
| 3,611,069 | 10/1971 | Galginaitis et al. | 148—171 UX |
| 3,600,240 | 8/1971 | Rupprecht et al. | 148—171 |

| | | | |
|---|---|---|---|
| 3,687,743 | 8/1972 | Le Duc | 148—172 X |
| 3,632,431 | 1/1972 | Andre et al. | 148—171 X |
| 3,537,029 | 10/1970 | Kressel et al. | 148—171 X |

FOREIGN PATENTS

| | | | |
|---|---|---|---|
| 1,149,109 | 4/1969 | Great Britain | 148—171 |

GEORGE T. OZAKI, Primary Examiner

U.S. Cl. X.R.

148—172; 252—62.3 GA; 317—235 R